US010437999B1

(12) United States Patent
Bhattacharyya et al.

(10) Patent No.: US 10,437,999 B1
(45) Date of Patent: Oct. 8, 2019

(54) RUNTIME MALWARE DETECTION

(71) Applicant: Symantec Corporation, Mountain View, CA (US)

(72) Inventors: Debanjan Bhattacharyya, Pune (IN); Swapnil Shukla, Gujarat (IN)

(73) Assignee: Symantec Corporation, Mountain View, CA (US)

(*) Notice: Subject to any disclaimer, the term of this patent is extended or adjusted under 35 U.S.C. 154(b) by 45 days.

(21) Appl. No.: 15/253,502

(22) Filed: Aug. 31, 2016

(51) Int. Cl.
*G06F 21/56* (2013.01)
*G06F 16/13* (2019.01)

(52) U.S. Cl.
CPC .......... *G06F 21/566* (2013.01); *G06F 16/13* (2019.01)

(58) Field of Classification Search
CPC .................. G06F 21/566; G06F 17/30091
See application file for complete search history.

(56) References Cited

U.S. PATENT DOCUMENTS

| 8,826,439 | B1* | 9/2014 | Hu | G06F 21/563 |
| | | | | 726/24 |
| 9,536,084 | B1* | 1/2017 | Lukacs | G06F 21/554 |
| 2008/0127336 | A1* | 5/2008 | Sun | G06F 21/566 |
| | | | | 726/22 |
| 2008/0295171 | A1* | 11/2008 | Singh | H04L 63/1416 |
| | | | | 726/23 |
| 2009/0172815 | A1* | 7/2009 | Gu | G06F 21/552 |
| | | | | 726/23 |
| 2010/0194756 | A1* | 8/2010 | Schich | G06F 17/30274 |
| | | | | 345/440 |
| 2011/0219449 | A1* | 9/2011 | St. Neitzel | G06F 11/00 |
| | | | | 726/23 |
| 2012/0084859 | A1* | 4/2012 | Radinsky | G06F 21/56 |
| | | | | 726/23 |
| 2014/0123280 | A1* | 5/2014 | Kedma | G06F 21/56 |
| | | | | 726/23 |
| 2015/0058984 | A1* | 2/2015 | Shen | G06F 21/52 |
| | | | | 726/23 |
| 2016/0277423 | A1* | 9/2016 | Apostolescu | H04L 63/145 |

OTHER PUBLICATIONS

KyoungSoo Han et al., "Malware Analysis Using Visualized Image Matrices," Jul. 16, 2014, pp. 1-12. (Year: 2014).*

(Continued)

*Primary Examiner* — Luu T Pham
*Assistant Examiner* — Canh Le
(74) *Attorney, Agent, or Firm* — Holland & Hart LLP

(57) ABSTRACT

A method for runtime malware detection is described. In one embodiment, the method may include classifying a first file as clean and a second file as malware, performing a sample execution of the first and second files, identifying system processes called during sample executions of the first and second files, mapping each system process of the host operating system to a position on an image matrix, indicating each system process called during the sample execution of the first file in a first image matrix and each system process called during the sample execution of the second file in a second image matrix, and determining at runtime a probability an unknown file includes malware based at least in part on an analysis of the unknown file in relation to at least one of the first instance and the second instance of the generated image matrix.

16 Claims, 8 Drawing Sheets

(56) References Cited

OTHER PUBLICATIONS

Iker Burguera et al., "Crowdroid: Behavior-Based Malware Detection System for Android," ACM,, Oct. 17, 2011, pp. 15-25. (Year: 2011).*
M. Wagner, "A Survey of Visualization Systems for Malware Analysis," 2015, pp. 1-21. (Year: 2015).*
Nataraj, L., Karthikeyan, S., Jacob, G., and Manjunath, B. 2011. Malware Images: Visualisation and Automatic Classification. Proceedings of Visualisation for Cyber Security (VizSec). 2011: 1-7.
Long, Alexander, Joshua Saxe, and Robert Gove. "Detecting Malware Samples with Similar Image Sets." In Proceedings of the 2014 IEEE Workshop on Visualisation for Cyber Security, 2014. (VizSec 14). Paris: ACM, 2014.
Trinius, P., Holz, T., Gobel, J., and Freiling, F. C. 2009. Visual Analysis of Malware Behaviour Using Treemaps and Thread Graphs. 6th International Workshop on Visualisation for Cyber Security, 2009 (VizSec 2009). Oct. 2009. 33-38.
Quist, D. A. and Liebrock, L. M. 2009. Visualising Compiled Executables for Malware Analysis. In International Workshop on Visualisation for Cyber Security (VizSec). 27-32.
Shaid, S.Z.M., and Maarof, M.A. "Malware Behaviour Visualisation." Journal Teknologi 70, No. 5 (2014).
Donahue, J., A. Paturi, and S. Mukkamala. "Visualization Techniques for Efficient Malware Detection." In 2013 IEEE International Conference on Intelligence and Security Informatics (ISI), 289-91, 2013. doi:10.1109/ISI.2013.6578845.

* cited by examiner

RUNTIME MALWARE DETECTION

BACKGROUND

The use of computer systems and computer-related technologies continues to increase at a rapid pace. This increased use of computer systems has influenced the advances made to computer-related technologies. Computer systems have increasingly become an integral part of the business world and the activities of individual consumers. Computer systems may be used to carry out several business, industry, and academic endeavors.

The wide-spread use of computers and mobile devices has caused an increased presence of malicious programs such as rootkits, spyware, trojans, and the like. Malware programmers are continually adapting to the improvements made in malware detection, which creates an ongoing cycle of malware techniques adapting to improvements in malware detection.

SUMMARY

According to at least one embodiment, a method for runtime malware detection is described. In one embodiment, the method may include classifying a first file as being clean from malware and a second file as malware, performing a sample execution of the first file and a sample execution of the second file, and identifying one or more system processes of a host operating system called during the sample execution of the first file and one or more system processes of the host operating system called during the sample execution of the second file. In some cases, the method may include mapping each system process of the host operating system to a position on an image matrix having a predetermined number of rows and columns, each position corresponding to where a row and column intersect, and indicating each system process called during the sample execution of the first file in corresponding positions of a first instance of the generated image matrix and each system process called during the sample execution of the second file in corresponding positions of a second instance of the generated image matrix. In some cases, the method may include determining at runtime a probability an unknown file includes malware based at least in part on an analysis of the unknown file in relation to at least one of the first instance and the second instance of the generated image matrix.

In some embodiments, the method may include performing a sample execution of the unknown file, and identifying one or more system processes called during the sample execution of the unknown file, at least one of the system processes including an application program interface (API). In some embodiments, the method may include indicating each system process called during the sample execution of the unknown file in corresponding positions of a third instance of the generated image matrix.

In some embodiments, the method may include analyzing the third instance of the generated image matrix in relation to the first and second instances of the generated image matrix. In some embodiments, the method may include identifying a frequency of a system process called by the unknown process and assigning a value between a minimum of M and maximum of N to the system process called by the unknown process based on the identified frequency of the system process. In some embodiments, the method may include indicating, on the third instance of the generated image matrix, the frequency of the system process called by the unknown process.

In some embodiments, the method may include identifying a predetermined sequence in which two or more system processes are called by at least one of the first and second files while the respective sample executions are performed. In some embodiments, the method may include identifying the predetermined sequence being called by the unknown file. In some embodiments, the method may include indicating the predetermined sequence in an assigned position of the third instance of the generated image matrix.

In some embodiments, the method may include performing a security action when the probability that the unknown file includes malware is greater than a predetermined threshold. In some cases, the security action may include at least one of classifying the unknown file, sharing the classification of the unknown file with a remote computer system, quarantining the unknown file, deleting the unknown file, and performing further analysis on the unknown file.

A computing device configured for runtime malware detection is also described. The computing device may include a processor and memory in electronic communication with the processor. The memory may store computer executable instructions that when executed by the processor cause the processor to perform the steps of classifying a first file as being clean from malware and a second file as malware, performing a sample execution of the first file and a sample execution of the second file, and identifying one or more system processes of a host operating system called during the sample execution of the first file and one or more system processes of the host operating system called during the sample execution of the second file. In some cases, the processor may perform the steps of mapping each system process of the host operating system to a position on an image matrix having a predetermined number of rows and columns, each position corresponding to where a row and column intersect, each position corresponding to where a row and column intersect, and indicating each system process called during the sample execution of the first file in corresponding positions of a first instance of the generated image matrix and each system process called during the sample execution of the second file in corresponding positions of a second instance of the generated image matrix. In some cases, the processor may perform the steps of determining at runtime a probability an unknown file includes malware based at least in part on an analysis of the unknown file in relation to at least one of the first instance and the second instance of the generated image matrix.

A non-transitory computer-readable storage medium storing computer executable instructions is also described. When the instructions are executed by a processor, the execution of the instructions may cause the processor to perform the steps of classifying a first file as being clean from malware and a second file as malware, performing a sample execution of the first file and a sample execution of the second file, and identifying one or more system processes of a host operating system called during the sample execution of the first file and one or more system processes of the host operating system called during the sample execution of the second file. In some cases, the processor may perform the steps of generating an image matrix of rows and columns, mapping each system process of the host operating system to a position on an image matrix having a predetermined number of rows and columns, each position corresponding to where a row and column intersect, and indicating each system process called during the sample execution of the first file in corresponding positions of a first instance of the generated image matrix and each system process called during the sample execution of the second file in corresponding positions of a second instance of the generated image matrix. In some cases, the processor may perform the steps of determining at runtime a probability an unknown file includes malware based at least in part on an analysis of the unknown file in relation to at least one of the first instance and the second instance of the generated image matrix.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
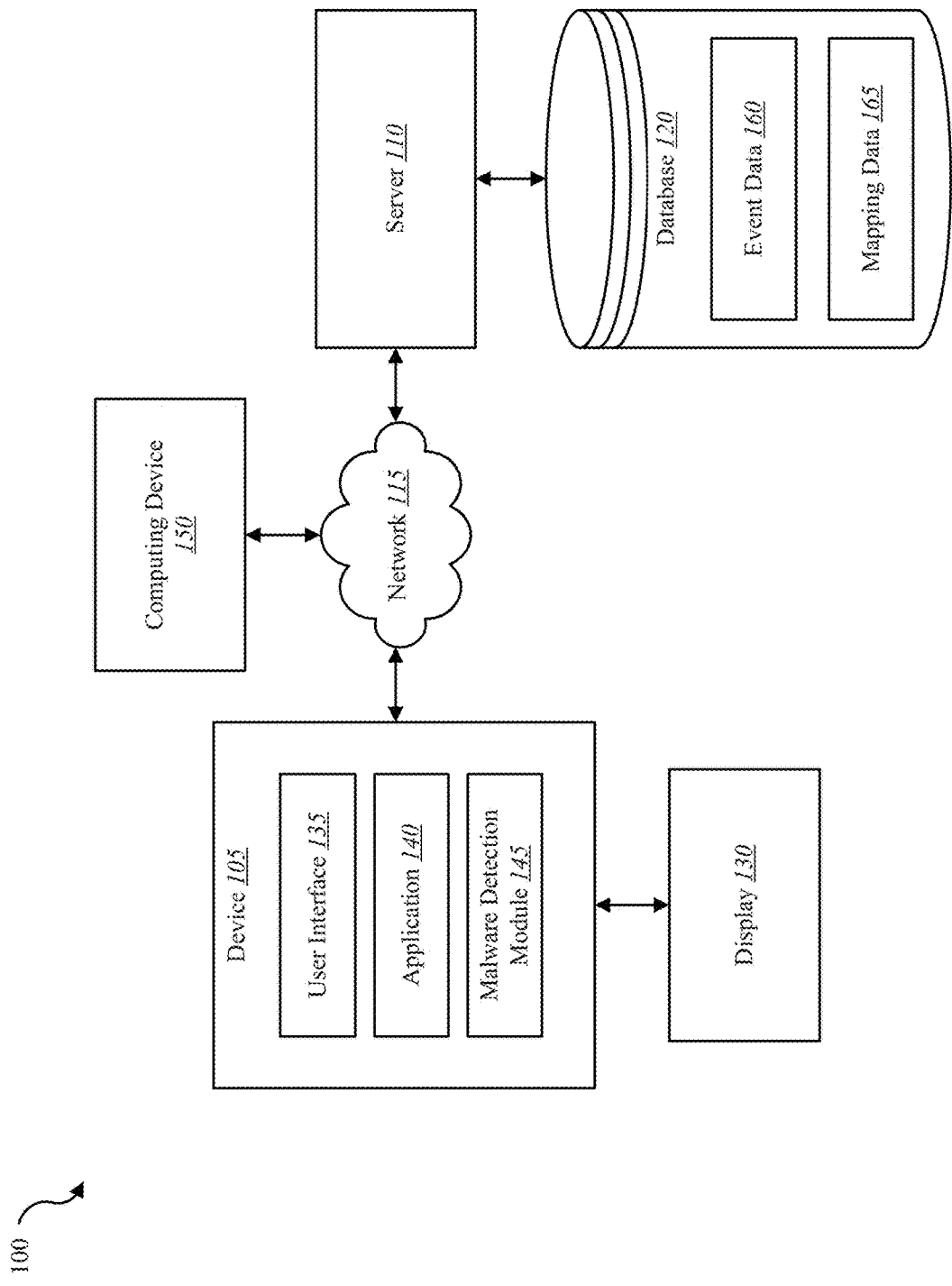
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to detecting malware using deep convolutional nets. More specifically, the systems and methods described herein relate to runtime malware detection in relation to unknown files.

As malware detection techniques evolve, so do malware evasion techniques. Malware is increasingly aware of its hosting environment. In some cases, malware may modify its behavior when it detects an unfavorable environment. In some cases, malware may use compression methods and obfuscation of internal data to avoid detection. Malware may stagger its intent over time through multiple executions and processes to remain concealed. Evasion techniques such as these make it difficult to define generic signatures based on static or dynamic analysis of samples.

In some embodiments, machine learning models have been configured to learn patterns that cannot be formulated through manual or specific behavior based analysis. However, feature based machine learning, either supervised, or unsupervised has its limitations in identifying complex patterns that are dispersed and/or occluded. Machine learning efficacy may decrease when malware modifies its behavior and/or the feature space changes to a relatively significant degree. An example of this may be seen in training on a set of images with objects of different sizes and shapes such as full length photos of humans facing the camera. Feature based models learning on such a set of images, trained to identify humans from objects, will fail if suddenly the prediction set has images of humans in sitting position or looking sideways, etc. Deep neural nets or deep neural convolutional nets have proven to be a reliable approach in this area. Deep neural nets can learn patterns in atomic features and its relations with the bigger picture in a hierarchal bottom up way within complex feature spaces. Properly trained models can recognize such patterns and relations even if the overall feature space changes significantly. The malware detection technique proposed herein may use deep neural nets to transform sample execution behavior into an image equivalent feature space. In some cases, the systems and methods disclosed herein may use a deep convolutional neural network to create high efficacy models to predict malware.

In one embodiment, the present systems and methods may include transforming sample execution behavior of an unknown or unclassified file into an image. One or more images may be generated based on individual system processes and/or sequences of system processes called during one or more sample executions. In some cases, an image may be generated based on an identified frequency of individual system processes and/or sequences of system processes. In some cases, the system process calls may include application program interface (API) calls. In one embodiment, the present systems and methods may include using image representations of sample executions to train deep convolutional neural nets for malware detection. In some cases, the present systems and methods may include using a deep convolutional neural net model derived from the image representations of sample executions to provide a run time prediction of an unknown file's likelihood of including malware.

File execution behavior may be recorded through various tools. In some cases, the present systems and methods may include an API-hooking functionality. Additionally, or alternatively, the present systems and methods may be configured to spoof certain API calls to impersonate a typical victim machine environment resulting in malware behaving in its intended malicious manner. For example, spoofing a typical victim machine environment may trick the malware to function without employing evasion techniques. In some cases, the present systems and methods may record API calls made by a process during its execution. The present systems and methods may perform the functions described herein once a sufficient sample of API call logs are obtained from both malware and clean files, the sufficient number being predetermined.

In one embodiment, the present systems and methods may include mapping system processes to identifiers. In some cases, a system process may be mapped to a unique identifier or globally unique identifier (GUID). In one embodiment, the mapping between system processes and identifiers may be saved in a table. In some embodiments, an execution log file may be generated for each sample execution. In one embodiment, an execution log file may include a sequence of system processes called during the sample execution. In some cases, the sequence of system processes called may be converted to their corresponding identifiers. In some embodiments, a sample execution of a parent process may result in one or more other processes being spawned. For example, a parent process may invoke one or more other processes during its sample execution. One or more other execution log files may be generated for each spawned process. In some embodiments, the execution log file of each spawned process may be combined with the execution log file of the parent process and treated as a single execution log file.

In some embodiments, one or more recognizable sequences of system processes may be called during a sample execution. One or more permutations these sequences may be assigned a unique identifier as well as individual system processes. In one embodiment, the system process may include one or more APIs. A sequence of called APIs may be referred to as API phrases. Permutations of n long API phrases may be referred to as ngrams, where n may range from 2 to a maximum number. Each ngram may be assigned a numeric unique id. In one embodiment, a maximum of n may be a value of 4. Thus, in some embodiments, API phrases that range in length from 2 to 4 called APIs may be assigned to unique identifiers. In some embodiment, each individual process and sequence of processes may be referred to as events during the sample execution.

In one embodiment, for each sample execution, a frequency map may be generated to store the number of occurrences for each event during the sample execution. In one embodiment, when an execution log file includes multiple executions of the same file then the frequencies of called processes may be averaged across the number of executions. For example, an unknown file may be involved in two or more separate executions. For instance, a file may be associated with three sample executions and thus, the frequency of any process during the executions may be averaged over the three executions. For example, if a particular process is called 6 times in the first execution, 7 times in the second execution, and 5 times in the third execution, then the values may be summed giving a value of 18, and the 18 occurrences may be averaged over the three executions giving an average of 6 occurrences per execution.

In some embodiments, the unique identifiers mapped to particular system processes and/or APIs may be mapped to positions on a matrix or image matrix of rows and columns. In some cases, a position may be where a row and column of the matrix intersect. For example a matrix may include 100 rows and 100 columns, giving 10,000 positions. In some embodiments, the matrix may be referred to as an image of pixels, where each position includes one or more pixels.

In some embodiments, an image size of the matrix may be determined based on how many individual and sequence system processes are to be included in the matrix. In one embodiment, a host operating system may include thousands of system processes. In some cases, only a portion of the total number of system process of the host operating system may be mapped to a position on the matrix. In some cases, system processes are selected based on a review of the system processes in relation to previously classified files. The previously classified files may include a first set of files classified as malware and a second set of files classified as clean from malware. In some embodiments, the choice of events (individual processes and/or sequence of processes) mapped to positions of a matrix may be selected using a correlation analysis of all unique events seen in the samples against one or more target files (classified malicious and/or clean files). The top correlated events may be chosen for inclusion in the matrix.

In one embodiment, each chosen event may have its own fixed position in the image space of the matrix. The image space of the matrix may include a set interposed and intersecting rows and columns similar to the rows and columns of a spreadsheet. In some cases, each event may be assigned its own color, pattern, shape, and/or size. In some cases, each position may be assigned to a color with a solid pattern with a square shape. In some cases, each position may be the same size and/or shape. For example, based on a 400×400 pixel matrix, 10,000 events may be assigned to positions of the matrix where each event is a square shape of size 4×4 pixels. Alternatively, the size of a first position on the matrix may vary from the size of a second position on the matrix.

In one embodiment, to ensure that the images of each generated matrix have a uniform distribution of information (density of non-white pixels across the image space), the events may be distributed across the image space, uniformly, in relation to a prevalence of each event. A prevalence of an event may be determined based on a frequency of an event in relation to sample executions of one or more system processes.

In one embodiment, frequencies of each event may be used to assigned events to positions of a matrix according to prevalence. In some cases, events may be given fixed positions along rows of the matrix according to prevalence of each event.

In some embodiments, events may be positioned in the matrix randomly. Positioning events randomly may ensure that the images do not have all colored pixels in one area of the image space of the matrix. To ensure that there is a unique color gradient, across all boundaries of one event and another in the image space, in one embodiment, each event may be assigned a color such that no other adjacent event in the image space of the matrix has the same color. This may be achieved using only four colors and alternating its sequence along rows. In one embodiment, the colors may include Red, Green, Blue and Gray. For example, a first event may be assigned the color red with a solid pattern and a size of 4×4 pixels. In some embodiments the first event may be assigned to a first position of the matrix. In some cases, a second event may be assigned the color green with a solid pattern and a size of 4×4 pixels. In some cases, the second event may be assigned to a second position of the matrix. In some embodiments, the second position may be adjacent to the first position. In some embodiments, a third event may be assigned the color blue with a solid pattern at a third position. In some embodiments, a fourth event may be assigned the color gray with a solid pattern at a fourth position, and so forth.

With an event space of chosen events and each event having its fixed position, shape, color and size in the image space of a matrix, in some embodiments, same sized images may be generated from all different execution sequences derived from execution log files. In one embodiment, the position of an event on the matrix may determine its square space within the image space. In one embodiment, the color of the event or the square space may be determined by its column and row position in the event matrix. In one embodiment, a frequency of an event may be associated with a value. In some cases, a frequency may be associated with a value between the range of 0 to 255 for a total of 256 values. For example, an event called 100 times during a sample execution may be assigned a value of 32 within the range.

The relationship between the number of times an event is called (frequency) and the value assigned to the frequency may be based on a minimum and maximum of times any event occurs during a sample execution. For example, a first event may be occur 0 times, a second event 1 time, a third event 50 times, and a fourth event 100 times. In this example, the fourth event occurring 100 times may be a maximum among all events. Accordingly, a minimum of 0 occurrences and a maximum of 100 occurrences may be associated with and transformed into the range of 0 to 255. In some embodiments, the intensity value of a color of an event in the matrix may be determined by a transformation of its frequency into the range of frequency values. In one embodiment, the transformation between the frequency of an event and a frequency value may be performed using a log transformation and fixed buckets.

In one embodiment, the systems and methods may include training deep convolutional neural nets based on sample executions of a number of files preclassified as clean and sample executions of a number of files pre-classified as malware. In some cases, detection models may be generated based on the training of the deep convolutional neural nets. In some cases, the models derived from the training of the deep convolutional neural nets may be validated based on pre-classified files. In some cases, the models may be used to predict whether a file is more likely to be clean from malware or to include malware. In some cases, the models may be used to classify a file at runtime while the file is executing. In some cases, the systems and methods may target a file and parse a generated execution log file at intervals while the file executes. In some embodiments, the systems and methods may create one or more matrix images of the execution. In some embodiments, predictions may be made based on the one or more created matrix images of the execution to identify highly complex, occluded patterns across staggered executions over time.

The present systems and methods may be used to detect malware which are constantly evolving and implementing advanced evading techniques which can fool specific behavior or binary signatures. The present systems and methods may constantly monitor a file over time and across executions and build periodical execution images which enable detecting malware which staggers its intent over time. Once a model is built, creating images and predicting whether a file contains malware occurs in real time using minimal resources. In some cases, the present systems and methods may be performed on a client's machine itself without any noticeable impact on system performance and/or user experience.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, a display 130, a computing device 150, and a network 115 that allows the device 105, the server 110, and computing device 150 to communicate with one another.

Examples of the device 105 may include any combination of mobile devices, smart phones, tablet computing devices, personal computing devices, laptops, desktops, servers, media content set top boxes, digital video recorders (DVRs), etc. Examples of computing device 150 may include any combination of a mobile computing device, a laptop, a desktop, a server, a media set top box, or any combination thereof. Examples of server 110 may include any combination of a data server, a cloud server, a server associated with an automation service provider, proxy server, mail server, web server, application server, database server, communications server, file server, home server, mobile server, name server, or any combination thereof.

In some configurations, the device 105 may include a user interface 135, application 140, and malware detection module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, malware detection module 145, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a malware detection module 145. For example, device 105 may include application 140 that allows device 105 to interface with malware detection module 145 located on another device such as computing device 150 and/or server 110. In some embodiments, device 105 and/or server 110 may include a malware detection module 145 where at least a portion of the functions of malware detection module 145 are performed separately and/or concurrently on device 105 and/or server 110. Likewise, in some embodiments, a user may access the functions of device 105 (directly or through device 105 via malware detection module 145) from computing device 150. For example, in some embodiments, computing device 150 includes a mobile application that interfaces with one or more functions of device 105, malware detection module 145, and/or server 110.

In some embodiments, server 110 may be coupled to database 120. Database 120 may be internal or external to the server 110. In one example, device 105 may be coupled directly to database 120, database 120 being internal or external to device 105. Database 120 may include event data 160 and mapping data 165. For example, device 105 may access event data 160 in database 120 over network 115 via server 110. Event data 160 may include data regarding events detected during a sample execution of a file or process. For example, malware detection module 145 may perform a sample execution of a file and identify events that occur during the sample execution. For example, malware detection module 145 may determine how many system processes are called by the file during its sample execution. The identified events may be stored in event data 160. In some cases, event data 160 may store a list of every system process of a host operating system. In some embodiments, event data 160 may include one or more sequences of system processes that may be called by a file during its sample execution. In one embodiment, mapping data 165 may include data related to the system processes of a host operating system. In some cases, malware detection module 145 may map a system process to an identifier. Malware detection module 145 may store these mappings in mapping data 165. In some embodiments, one or more system processes and/or corresponding identifiers may be mapped to positions of a grid or matrix of rows and columns. In some cases, each intersection of a row and column may represent a position on the grid or matrix. In some embodiments, malware detection module 145 may be configured to perform the systems and methods described herein in conjunction with user interface 135 and/or application 140. User interface 135 and/or application 140 may enable a user to interact with, control, and/or program one or more functions of malware detection module 145. Further details regarding the malware detection module 145 are discussed below.

Figure 2:
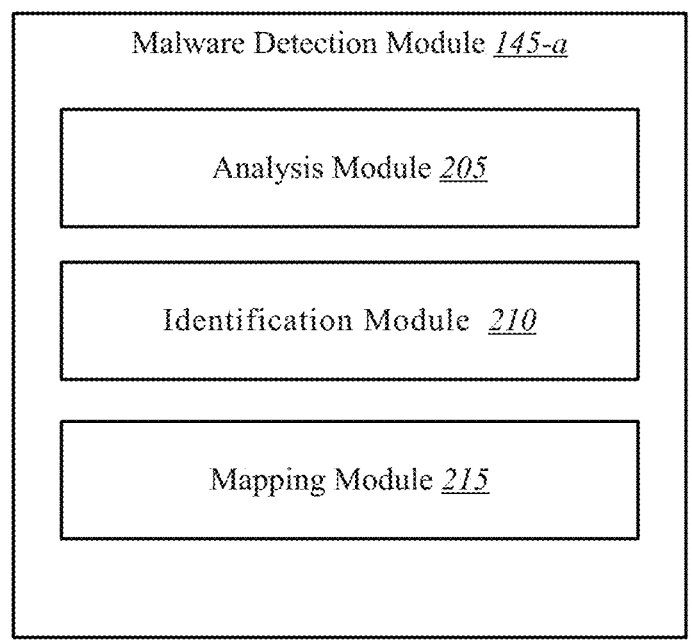
FIG. 2 is a block diagram illustrating one example of a malware detection module.

FIG. 2 is a block diagram illustrating one example of a malware detection module 145-*a*. Malware detection module 145-*a* may be one example of malware detection module 145 depicted in FIG. 1. As depicted, malware detection module 145-*a* may include analysis module 205, identification module 210, and mapping module 215.

In one embodiment, analysis module 205 may be configured to classify one or more files as malware and classify one or more other files as being clean from malware. In some cases, at least one of the one or more files may include an executable function that calls one or more system processes. In some embodiments, at least one of the one or more files may include an executable file. As one example, analysis module 205 may classify a first file as being clean from malware and a second file as containing malware. In one embodiment, the first and/or second files may be files among the one or more files classified by the analysis module 205.

In some embodiments, identification module 210 may be configured to perform a sample execution of the first file. Similarly, in some embodiments, identification module 210 may be configured to perform a sample execution of a second file. A sample execution may include configuring a computer system to simulate a typical environment of a user system interacting with the file being tested. For example, in one embodiment, the first file may include an executable and the sample execution may include executing the first file. In some cases, the first may be executed in a simulated environment of a user system. During the execution of the first file, the first file may call certain system processes of a host operating system while not calling certain other system processes of the host operating system. Accordingly, in some embodiments, a sample execution may indicate which system processes are called during the sample execution and which systems processes are not called.

In some embodiments, identification module 210 may be configured to identify one or more system processes of a host operating system called during the sample execution of a file that has been classified as clean or malware. In some cases, at least one of the system processes including an application program interface (API). For example, identification module 210 may identify one or more system processes called during a sample execution of a first file that is clean from malware. Similarly, identification module 210 may identify one or more system processes called during a sample execution of a second file that is classified as malware.

In some embodiments, mapping module 215 may be configured to generate an image matrix or matrix having a predetermined number of rows and columns. The matrix may be referred to as a grid, a graph, a lattice, a spreadsheet, etc. In some cases, each intersection of a row and column of the predetermined rows and columns may represent a system process of a host operating system. In some configurations, each position of the generated image matrix may be where a row and column intersect. In one embodiment, the image matrix may include X rows and Y columns where X and Y may be any positive integers. In some cases, X may be a value different from a value of Y. Alternatively, in some cases X may be a value equal to a value of Y.

In some embodiments, mapping module 215 may be configured to map each system process of the host operating system to a position on the generated image matrix. In one embodiment, each process may be uniquely mapped to one position of the generated image matrix. For instance, a first system process may be mapped to a first position of the generated image matrix and only the first position of the generated image matrix, a second system process may be mapped to a second position of the generated image matrix and only the second position of the generated image matrix, and so forth.

As one example, a given generated image matrix may include 100 rows and 100 columns, giving a matrix of 10,000 positions. Accordingly, 10,000 different system processes of a host operating system may be mapped uniquely to the 10,000 positions of the generated image matrix. In some instances, a host operating system may include more system processes than positions available on the generated image matrix.

For example, with a generated image matrix of 10,000 positions, a host operating system may include more than 10,000 system processes. In such a case, 10,000 system processes may be selected from all of the system processes of the host operating system.

In some embodiments, at least one instance of the generated image matrix may include a graphical representation of the generated image matrix. For example, each position where the rows and columns intersect may include one or more pixels. For a given instance of the generated image matrix, the area of pixels in each position may represent whether or not a system process was called in a relative sample execution. As one example, each position of the generated image matrix may include 4×4 pixels.

As an example, the generated image matrix may include four columns (A, B, C, D) and four rows (1, 2, 3, 4). Accordingly, position A1 may represent a first system process, A2 a second system process, A3 a third system process, and so on until D4, which may represent a sixteenth system process. In some cases, at least one position may represent a sequence of system processes. For example, position A4 may represent a sequence of two or more system processes. If the first system process is called in the sample execution, then the 4×4 pixel area of this first position may be filled in with a solid fill of pixels and/or a pattern of pixels such as stripes, shapes, dots, etc. As one example, the first position may be filled with red pixels. If the second process is not called, then the 4×4 pixel area of the second position may be left blank to graphically indicate the second system process was not called during the sample execution. In some embodiments, a blank position may be represented with white pixels.

In one embodiment, analysis module 205 may perform an analysis of the system processes of the host operating system to determine which system processes to select for the mapping. For instance, a host operating system may include 15,000 system processes, while the generated image matrix only has 10,000 positions. Accordingly, only 10,000 of the total 15,000 system processes may be associated with a generated image matrix that has 10,000 positions, such as a 100×100 matrix where X=100 and Y=100.

In some embodiments, analysis module 205 may analyze the one or more files classified as malware and/or clean from malware to determine which system processes to select for the mapping. For example, analysis module 205 may determine which system processes are more likely to be called by an unknown file based on system processes called by the already classified one or more files.

In some embodiments, mapping module 215 may generate a first instance of the generated image matrix in relation to the sample execution of the first file.

As explained above, the sample execution of the first file may indicate each system process called by the first file during its sample execution. In some cases, mapping module 215 may indicate, in corresponding positions of a first instance of the generated image matrix, each system process called during the sample execution of the first file. Additionally, or alternatively, mapping module 215 may be configured to indicate, in corresponding positions of the first instance of the generated image matrix, each system process not called during the sample execution of the first file.

In some embodiments, mapping module 215 may generate a second instance of the generated image matrix in relation to the sample execution of the second file. As explained above, the sample execution of the second file may indicate each system process called by the second file during its sample execution. In some cases, mapping module 215 may indicate, in corresponding positions of a second instance of the generated image matrix, each system process called during the sample execution of the second file. Additionally, or alternatively, mapping module 215 may be configured to indicate, in corresponding positions of the second instance of the generated image matrix, each system process not called during the sample execution of the second file.

In some embodiments, analysis module 205 may be configured to determine whether an unknown file includes malware. In some cases, analysis module 205 may determine a probability an unknown file includes malware. In one embodiment, the determination may be based at least in part on analysis module 205 performing an analysis of the unknown file in relation to at least one of the first and second instances of the generated image matrix. In one embodiment, analysis module 205 may perform a security action when the probability that the unknown file includes malware is greater than a predetermined threshold. In some cases, the security action may include at least one of classifying the unknown file, sharing the classification of the unknown file with a remote computer system, quarantining the unknown file, deleting the unknown file, and performing further analysis on the unknown file.

In some cases, the security action may include using deep neural nets to transform the sample execution behavior of a file into a matrix image. In some cases, the security action may use a deep convolutional neural network to create a model to predict malware. In one embodiment, the security action may include using image representations of sample executions to train deep convolutional neural nets for malware detection. In some cases, the security action may include using a deep convolutional neural net model derived from the matrix image representations of sample executions to provide a run time prediction of an unknown file's likelihood of including malware. In one embodiment, the security action may include training deep convolutional neural nets based on sample executions of a number of files pre-classified as clean and sample executions of a number of files pre-classified as malware. In some cases, detection models may be generated as a security action based on the training of the deep convolutional neural nets. In some cases, the models derived from the training of the deep convolutional neural nets may be validated as part of the security action based on preclassified files. In some cases, the security action may include using the models to predict whether a file is more likely to be clean from malware or to include malware. In some cases, the security action may include using the models to classify a file at runtime while the file is executing.

In one embodiment, identification module 210 may be configured to perform a sample execution of the unknown file. In some embodiments, identification module 210 may be configured to identify one or more system processes called during the sample execution of the unknown file. In some embodiments, mapping module 215 may be configured to indicate each system process called during the sample execution of the unknown file in corresponding positions of a third instance of the generated image matrix. In some cases, mapping module 215 may be configured to indicate each system process not called during the sample execution of the unknown file in corresponding positions of the third instance of the generated image matrix.

In one embodiment, analysis module 205 may be configured to analyze the third instance of the generated image matrix in relation to the first and second instances of the generated image matrix. In one embodiment, the analysis of the third instance may include comparing the third instance of the generated image matrix to the first and/or second instances of the generated image matrix.

In some embodiments, identification module 210 may be configured to identify a frequency of a system process called by the unknown process. In some embodiments, mapping module 215 may be configured to indicate, on an instance of the generated image matrix, the frequency of one or more system processes called by the unknown process. For example, a sample execution may indicate the unknown process calls a first process multiple times during the sample execution while calling a second process one time. In some embodiments, mapping module 215 may be configured to assign a value to the identified frequencies. In some cases, the value assigned may be selected from a range of values between a minimum of M and maximum of N. As one example, the range of values may range from a minimum of M=0 and maximum of N=255.

As one example, the mapping module 215 may place the value of the identified frequency in the position associated with the system process of the identified frequency. Additionally, or alternatively, the mapping module 215 may indicate the identified frequency in relation to a shade of the pixels in the position of the associated system process. For example, the mapping module 215 may assign a color to the pixels of the position to indicate the system process was called during the sample execution and indicate the identified frequency of the system process based on a shade applied to the color. The shade applied to the color may be determined based on the value applied to the frequency of the system process. As one example, the mapping module 215 may assign a color of red to the system process. Accordingly, mapping module 215 may fill in the pixels of the position of the system process with red pixels. Based on an indicated frequency of the system process, the shade of the red pixels may be varied between shades or hues of 0 to 255. As an example, the system process may be assigned a value of 128 out of 256 values (0 to 255) based on the identified frequency of the system process. Accordingly, the red pixels may be shaded to the value 128.

In some embodiments, identification module 210 may be configured to identify a sequence in which two or more system processes are called during a sample execution. For example, identification module 210 may identify a sequence of two or more system process called by the first file while the sample execution is performed. In some embodiments, mapping module 215 may indicate the identified sequence on the generated image matrix. For example, a first position of the generated image matrix may be mapped to a single system process while a second position may be mapped to a sequence of two or more system processes called during the sample execution.

In some embodiments, mapping module 215 may associate a position of the generated image matrix with a sequence of a third process, sixth process, and tenth process. In one embodiment, identification module 210 may be configured to identify the sequence being called by the unknown file during its sample execution. Accordingly, in some embodiments, mapping module 215 may be configured to indicate the sequence called by the unknown file in an assigned position of the third instance of the generated image matrix. For example, the unknown file may call a first system process during the sample execution of the unknown file. Accordingly, mapping module 215 may indicate the first process in its assigned position in the generated image matrix. During the same sample execution, the unknown file may call the sequence of the third process, sixth process, and tenth process. Accordingly, mapping module 215 may indicate the sequence in its assigned position in the generated image matrix.

Figure 3:
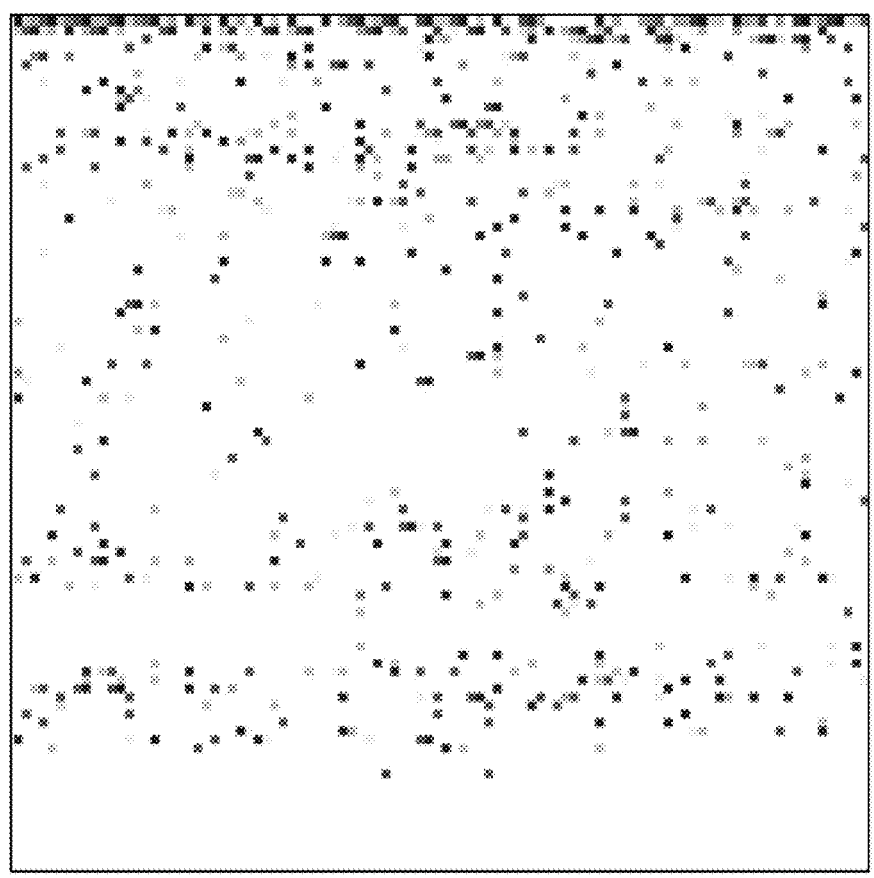
FIG. 3 is an example of an image matrix suitable for implementing the present systems and methods.

FIG. 3 is an example of an image matrix 300 suitable for implementing the present systems and methods. In one embodiment, the image matrix 300 may include multiple rows and columns. Each intersection of a row and column may represent a position. As shown, image matrix 300 may include 100 columns and 100 rows, giving 10,000 positions. In one embodiment, each position may be represented by a pixel square. In some cases, each pixel square may include one or more pixels. For example, in one embodiment, each position may include a 4×4 pixel square. Although the pixel squares depicted in image matrix 300 are shown in grayscale, in one embodiment, each pixel may include colored pixel squares. In one embodiment, image matrix 300 may include pixel squares in colors such as red, yellow, blue, green, purple, pink, brown, black, gray, etc. In one embodiment, a pixel square filled in with one of these colors may indicate a certain system process was called during a sample execution of a file associated with a given image matrix. In some embodiments, a pixel square left blank (filled in white) may indicate a system process associated with that pixel square was not called during the sample execution of the file associated with the given image matrix.

In one embodiment, image matrix 300 may represent system processes called by a file during a sample execution of the file. For example, an unknown file may be analyzed during a sample execution of the unknown file. In one embodiment, the present systems and methods may record each system process called by the unknown file during its sample execution. In some cases, the present systems and methods may recognize one or more sequences of system processes called by the unknown file during its sample execution. In one embodiment, the present systems and methods may map a particular system process to a particular position on image matrix 300. In some cases, the present systems and methods may map a particular sequence of system processes to a position of image matrix 300. In one embodiment, the first position in the upper left corner of image matrix 300 (first column, first row) may be mapped to a first system process, a position below this (first column, second row) may be mapped to a first sequence of system processes, and the position below this (first column, third row) may be mapped to a second system process, and so forth. Based on the sample execution, the systems and methods described herein may determine whether the unknown file called the first system process, second system process, and/or first sequence during its sample execution. As shown, the position of the first system process (first column, first row) is filled in with a somewhat black pixel, the position of the first sequence (first column, second row) is filled in with a somewhat gray pixel, and the position of the second system process (first column, third row) is blank (white pixel). Accordingly, in one embodiment, image matrix 300 indicates that the unknown file called the first system process and the first sequence during its sample execution, but did not call the second system process during its sample execution.

In some embodiments, the present systems and methods may adjust the intensity of a color of a filled in pixel square based on the frequency of the system process mapped to that position in relation to the sample execution. For example, pixel square A may be mapped to system process A (or sequence A) and pixel square B may be mapped to system process B (or sequence B). Pixel square A may be filled in with a red pixel and pixel square B may also be filled in with a red pixel, indicating both system process A and system process B were called during the sample execution. In some embodiments, the present systems and methods may determine that system process A was called once during the sample execution and that system process B was called 100 times during the sample execution. In some embodiments, the present systems and methods may indicate the frequencies with which each system process and/or sequence is called during the sample execution. Thus, in some embodiments, the present systems and methods may adjust the intensity or saturation of the red pixel in pixel square A to be less than the intensity or saturation of the red pixel in pixel square B to indicate the system process B was called more time than system process A during the sample execution. In some embodiments, the present systems and methods may assign colors to pixels squares in a pattern where no other adjacent pixel square is assigned to the same color. Thus if pixel square A is assigned a red pixel, then any pixel square above, below, to the left, and/or to the right of pixel square A may not be assigned the color red as well.

In one embodiment, a host operating system may include more system processes than positions of a given image matrix. For example, image matrix 300 includes positions for 10,000 system processes and/or sequences of system processes, while the host operating system may include more than 10,000 system processes. Accordingly, the present systems and methods may select a portion of all the system processes to be mapped to positions of image matrix 300. In some embodiments, the present systems and methods may select where to map the systems processes and/or sequences on image matrix 300. As shown in image matrix 300, the majority of pixels squares filled in are towards the top of image matrix 300, indicating the system processes and/or sequences mapped to the top positions of image matrix 300 may include system processes more prevalently called during a given sample execution.

Figure 4:
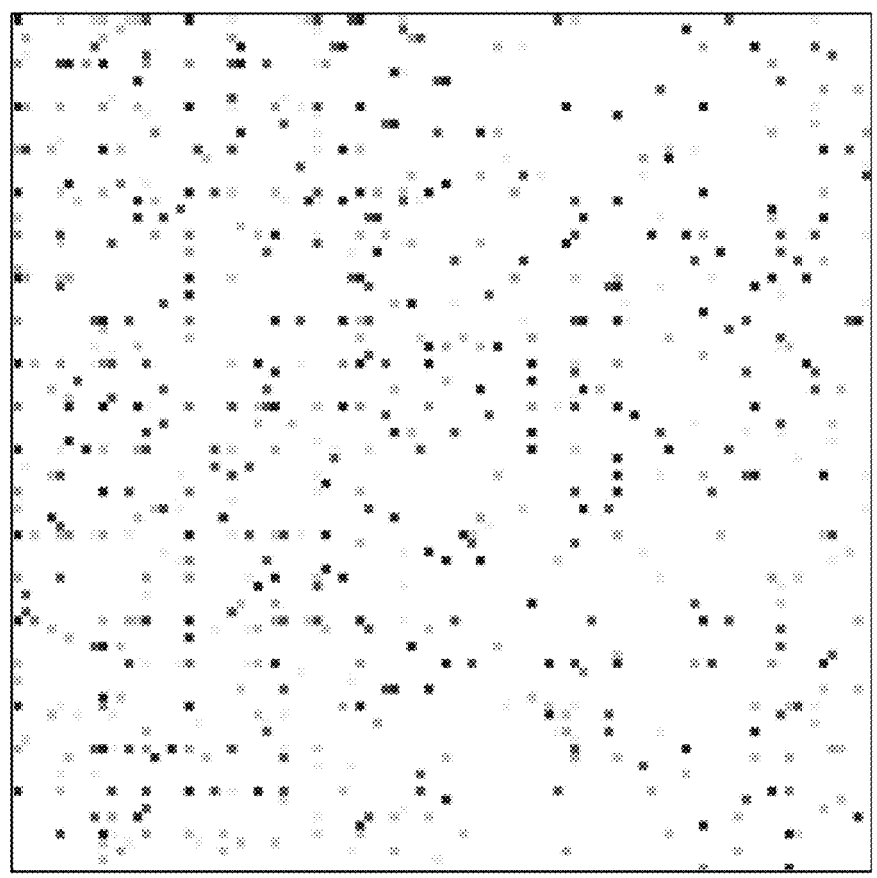
FIG. 4 is another example of an image matrix suitable for implementing the present systems and methods.

FIG. 4 is another example of an image matrix 400 suitable for implementing the present systems and methods. As described above in relation to FIG. 3, in some embodiments, the present systems and methods may select where to map the systems processes and/or sequences on image matrix 400. As shown, in one embodiment, the present systems and methods may spread the selected system processes and/or sequences logically across the positions of image matrix 400, resulting in the logical spread of system processes and/or sequences called during a given sample execution as shown in image matrix 400.

Figure 5:
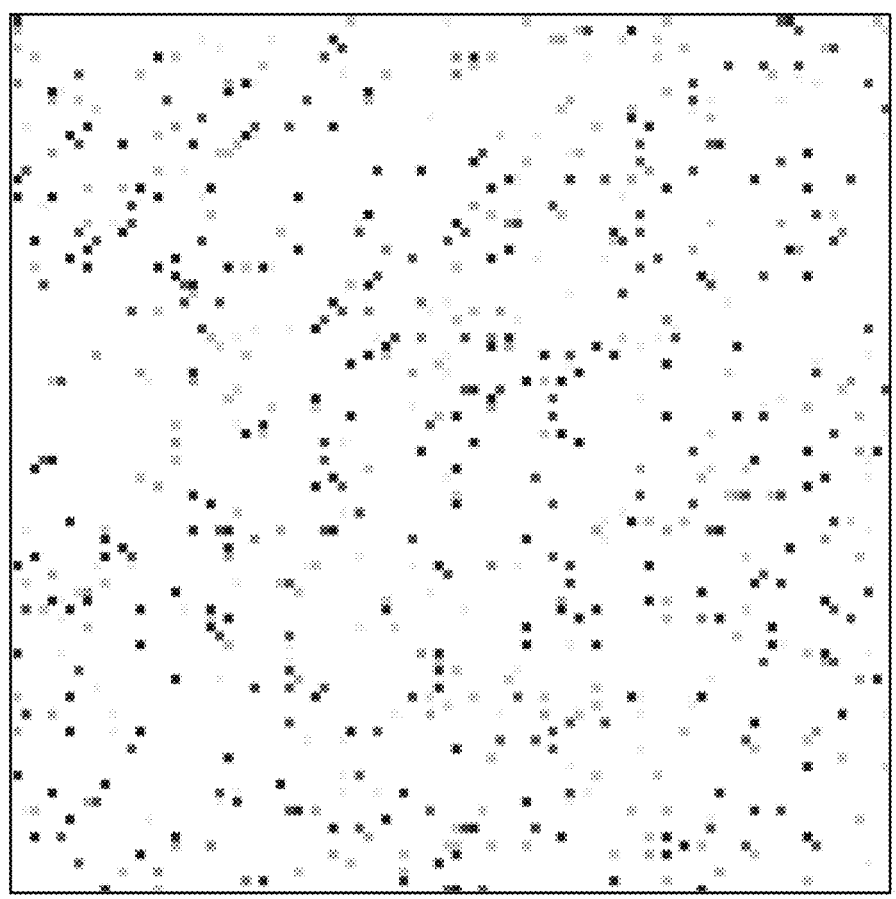
FIG. 5 is another example of an image matrix suitable for implementing the present systems and methods.

FIG. 5 is another example of an image matrix 500 suitable for implementing the present systems and methods. Again, as described above in relation to FIGS. 3 and/or 4, in some embodiments, the present systems and methods may select where to map the systems processes and/or sequences on image matrix 500. As shown, in one embodiment, the present systems and methods may spread the selected system processes and/or sequences randomly across the positions of image matrix 500, resulting in the random spread of system processes and/or sequences called during a given sample execution as shown in image matrix 500.

Figure 6:
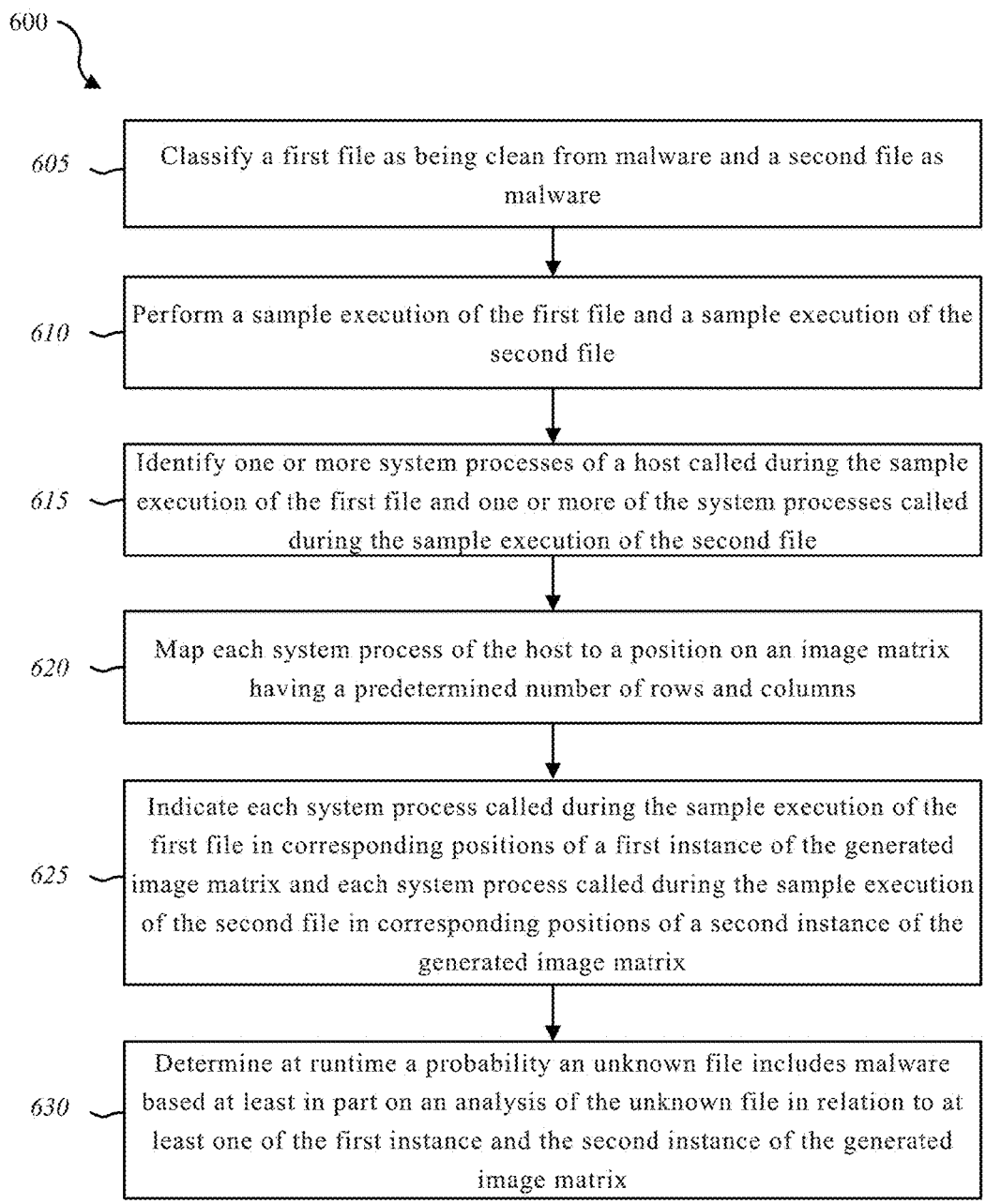
FIG. 6 is a flow diagram illustrating one embodiment of a method for runtime malware detection.

FIG. 6 is a flow diagram illustrating one embodiment of a method 600 for runtime malware detection. In some configurations, the method 600 may be implemented by the malware detection module 145 illustrated in FIGS. 1 and/or 2. In some configurations, the method 600 may be implemented in conjunction with the application 140 and/or the user interface 135 illustrated in FIG. 1.

At block 605, the method 600 may include classifying a first file as being clean from malware and a second file as malware. At block 610, the method 600 may include performing a sample execution of the first file and a sample execution of the second file. At block 615, the method 600 may include identifying one or more system processes of a host operating system called during the sample execution of the first file and one or more system processes of the host operating system called during the sample execution of the second file. In some embodiments, the method 600 may include generating an image matrix of rows and columns. At block 620, the method 600 may include mapping each system process of the host operating system to a position on an image matrix having a predetermined number of rows and columns. In some cases, each position on the image matrix may be where a row and column intersect. At block 625, the method 600 may include indicating each system process called during the sample execution of the first file in corresponding positions of a first instance of the generated image matrix and each system process called during the sample execution of the second file in corresponding positions of a second instance of the generated image matrix. At block 630, the method 600 may include determining at runtime a probability an unknown file includes malware based at least in part on an analysis of the unknown file in relation to at least one of the first instance and the second instance of the generated image matrix.

Figure 7:
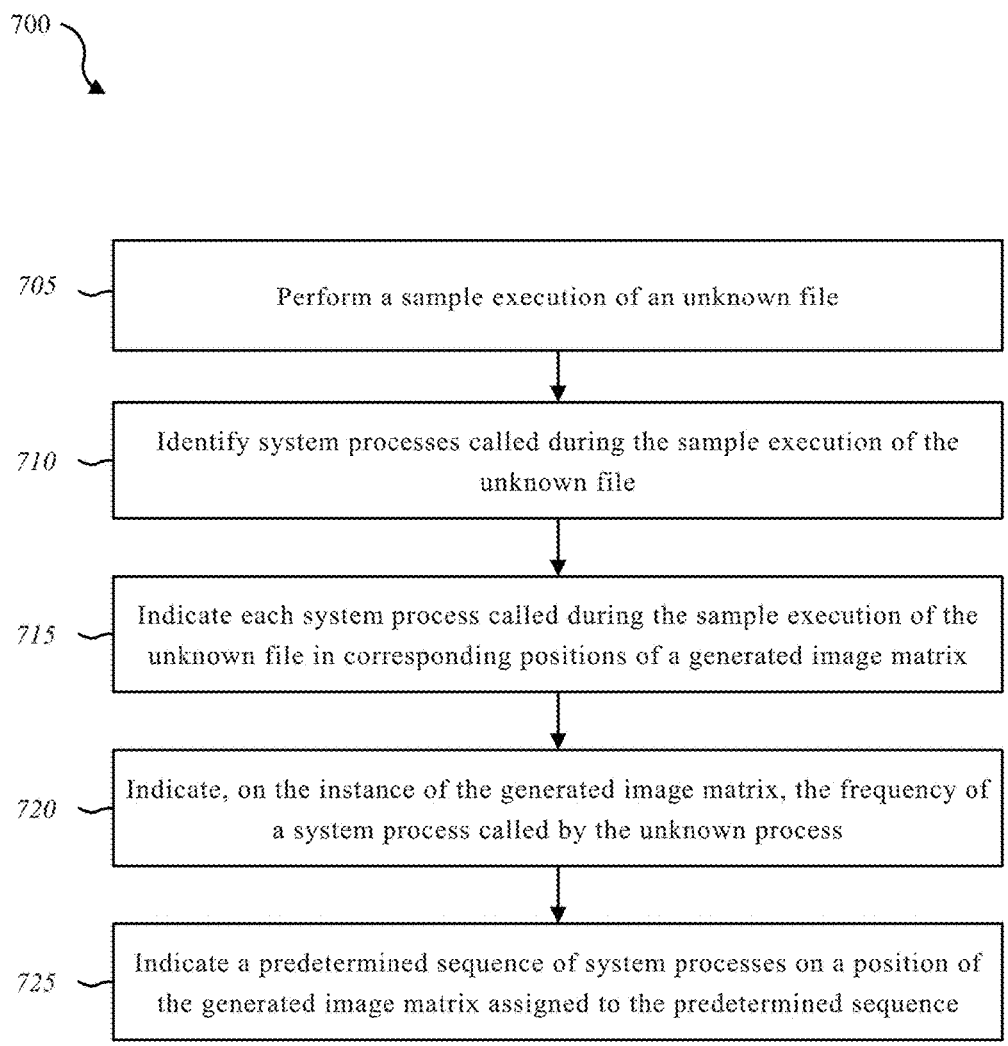
FIG. 7 is a flow diagram illustrating one embodiment of a method for runtime malware detection.

FIG. 7 is a flow diagram illustrating one embodiment of a method 700 for runtime malware detection. In some configurations, the method 700 may be implemented by the malware detection module 145 illustrated in FIG. 1 or 2. In some configurations, the method 700 may be implemented in conjunction with the application 140 and/or the user interface 135 illustrated in FIG. 1.

At block 705, the method 700 may include performing a sample execution of an unknown file. At block 710, the method 700 may include identifying system processes called during the sample execution of the unknown file. At block 715, the method 700 may include indicating each system process called during the sample execution of the unknown file in corresponding positions of a generated image matrix. At block 720, the method 700 may include indicating, on the third instance of the generated image matrix, the frequency of a system process called by the unknown process. In some cases, the method 700 may include identifying a frequency of a system process called by the unknown process and assigning a value to the system process based on its identified frequency. At block 725, the method 700 may include indicating a predetermined sequence of system processes on a position of the generated image matrix assigned to the predetermined sequence. In some cases, the method 700 may include recognizing one or more predetermined sequences of system processes. As an example, a first predetermined sequence may include system process A, then system process C, then system process E, while a second predetermined sequence may include system process B, following by system process J, followed by system process L, then system process W. In some configurations, the method 700 may include identifying a predetermined sequence called by the unknown file during its sample execution. In some cases, a position on the generated image matrix may be reserved for this particular sequence of system processes.

Figure 8:
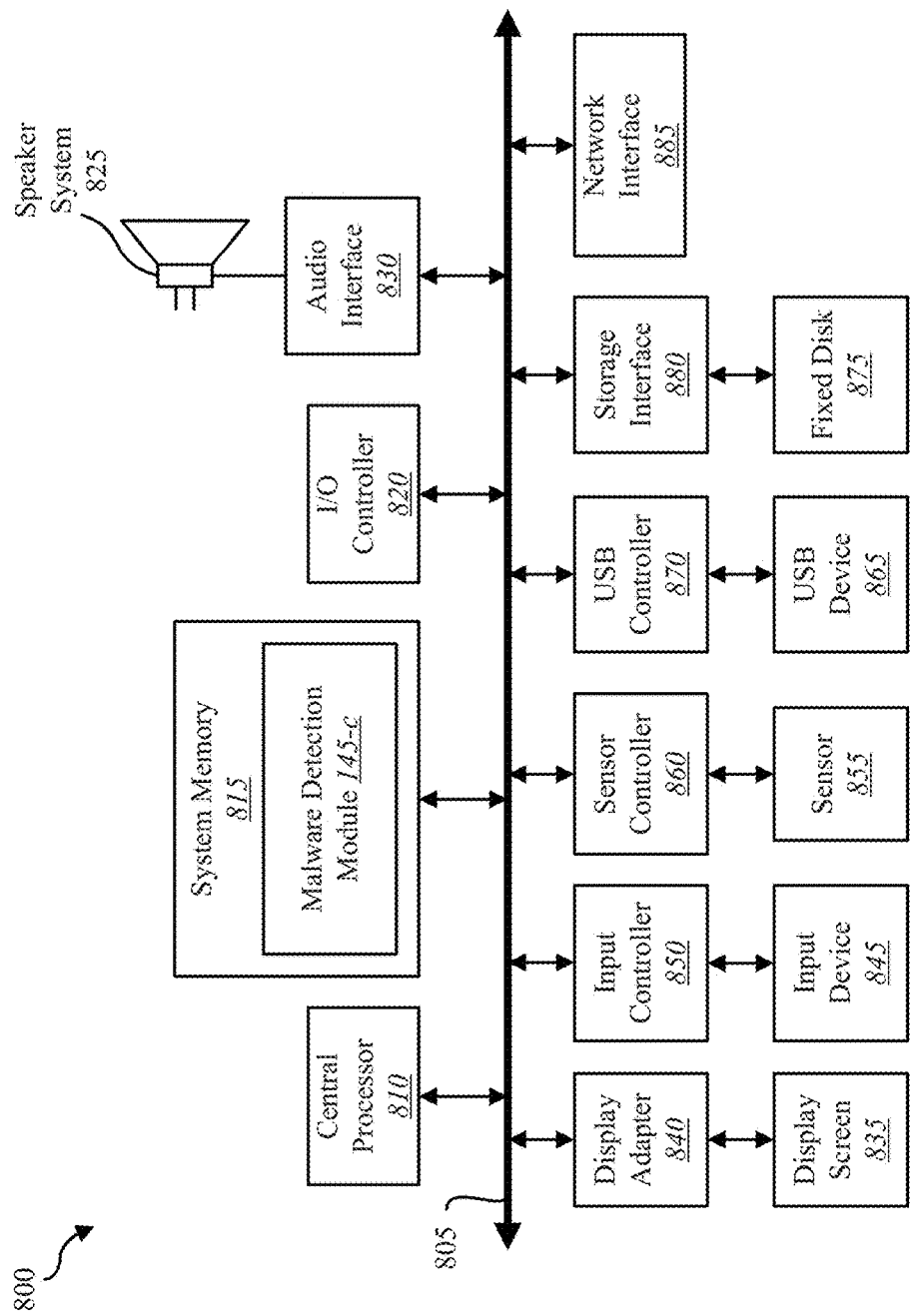
FIG. 8 depicts a block diagram of a computer system suitable for implementing the present systems and methods.

FIG. 8 depicts a block diagram of a computing device 800 suitable for implementing the present systems and methods. The device 800 may be an example of device 105, computing device 150 and/or server 110 illustrated in FIG. 1. In one configuration, device 800 includes a bus 805 which interconnects major subsystems of device 800, such as a central processor 810, a system memory 815 (typically RAM, but which may also include ROM, flash RAM, or the like), an input/output controller 820, an external audio device, such as a speaker system 825 via an audio output interface 830, an external device, such as a display screen 835 via display adapter 840, an input device 845 (e.g., remote control device interfaced with an input controller 850), multiple USB devices 865 (interfaced with a USB controller 870), and a storage interface 880. Also included are at least one sensor 855 connected to bus 805 through a sensor controller 860 and a network interface 885 (coupled directly to bus 805).

Bus 805 allows data communication between central processor 810 and system memory 815, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the malware detection module 145-c to implement the present systems and methods may be stored within the system memory 815. The malware detection module 145-c may be one example of the malware detection module 145 depicted in FIGS. 1, 2, and/or 6. Applications (e.g., application 140) resident with device 800 are generally stored on and accessed via a non-transitory computer readable medium, such as a hard disk drive (e.g., fixed disk 875) or other storage medium. Additionally, applications can be in the form of electronic signals modulated in accordance with the application and data communication technology when accessed via interface 885.

Storage interface 880, as with the other storage interfaces of device 800, can connect to a standard computer readable medium for storage and/or retrieval of information, such as a fixed disk drive 875. Fixed disk drive 875 may be a part of device 800 or may be separate and accessed through other interface systems. Network interface 885 may provide a direct connection to a remote server via a direct network link to the Internet via a POP (point of presence). Network interface 885 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 800 wirelessly via network interface 885.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 8 need not be present to practice the present systems and methods. The devices and subsystems can be interconnected in different ways from that shown in FIG. 8. The aspect of some operations of a system such as that shown in FIG. 8 are readily known in the art and are not discussed in detail in this application. Code to implement the present disclosure can be stored in a non-transitory computer-readable medium such as one or more of system memory 815 or fixed disk 875. The operating system provided on device 800 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for malware detection at runtime, at least a portion of the method being performed by a computing device comprising at least one processor, the method comprising:

classifying a first file as being clean from malware and a second file as malware;

performing a sample execution of the first file and a sample execution of the second file;

identifying one or more system processes of a host operating system called during the sample execution of the first file and one or more system processes of the host operating system called during the sample execution of the second file;

generating an image matrix having a predetermined number of rows and columns, the image matrix comprising positions corresponding to where a row and column intersect, wherein each position comprises one or more pixels;

mapping each system process of the host operating system to the one or more pixels of a position on the image matrix;

indicating each system process called during the sample execution of the first file in corresponding positions of a first instance of the generated image matrix and each system process called during the sample execution of the second file in corresponding positions of a second instance of the generated image matrix;

identifying a frequency of a system process from the one or more system processes called by an unknown file;

performing a sample execution of the unknown file;

indicating, on a third instance of the generated image matrix, the identified frequency of the system process called by the unknown file;

determining at runtime a probability that the unknown file includes malware based at least in part on an analysis of the third instance of the generated image matrix in relation to at least one of the first instance and the second instance of the generated image matrix; and performing a security action to protect the computing device from the unknown file when the probability that the unknown file includes malware is greater than a predetermined threshold, the security action comprising quarantining the unknown file or deleting the unknown file.

2. The method of claim 1, comprising:

identifying one or more system processes called during the sample execution of the unknown file, at least one of the system processes including an application program interface (API).

3. The method of claim 2, comprising:

indicating each system process called during the sample execution of the unknown file in corresponding positions of the third instance of the generated image matrix.

4. The method of claim 3, comprising:

analyzing the third instance of the generated image matrix in relation to the first and second instances of the generated image matrix.

5. The method of claim 3, further comprising:

assigning a value between a minimum of M and maximum of N to the system process called by the unknown file based on the identified frequency of the system process.

6. The method of claim 3, comprising:

identifying a predetermined sequence in which two or more system processes are called by at least one of the first and second files while the respective sample executions are performed.

7. The method of claim 6, comprising:

identifying the predetermined sequence being called by the unknown file.

8. The method of claim 7, comprising:

indicating the predetermined sequence in an assigned position of the third instance of the generated image matrix.

9. A computing device configured for malware detection, comprising:

a processor;

memory in electronic communication with the processor, wherein the memory stores computer executable instructions that when executed by the processor cause the processor to perform the steps of:

classifying a first file as being clean from malware and a second file as malware;

performing a sample execution of the first file and a sample execution of the second file;

identifying one or more system processes of a host operating system called during the sample execution of the first file and one or more system processes of the host operating system called during the sample execution of the second file;

generating an image matrix having a predetermined number of rows and columns, the image matrix comprising positions corresponding to where a row and column intersect, wherein each position comprises one or more pixels;

mapping each system process of the host operating system to the one or more pixels of a position on the image matrix;

indicating each system process called during the sample execution of the first file in corresponding positions of a first instance of the generated image matrix and each system process called during the sample execution of the second file in corresponding positions of a second instance of the generated image matrix;

identifying a frequency of a system process from the one or more system processes called by an unknown file;

performing a sample execution of the unknown file;

indicating, on a third instance of the generated image matrix, the identified frequency of the system process called by the unknown file;

determining at runtime a probability that the unknown file includes malware based at least in part on an analysis of the third instance of the generated image matrix in relation to at least one of the first instance and the second instance of the generated image matrix; and performing a security action to protect the computing device from the unknown file when the probability that the unknown file includes malware is greater than a predetermined threshold, the security action comprising quarantining the unknown file or deleting the unknown file.

10. The computing device of claim 9, wherein the instructions executed by the processor cause the processor to perform the steps of:

identifying one or more system processes called during the sample execution of the unknown file, at least one of the system processes including an application program interface (API).

11. The computing device of claim 9, wherein the instructions executed by the processor cause the processor to perform the steps of:

assigning a value between a minimum of M and maximum of N to the system process called by the unknown file based on the identified frequency of the system process.

12. The computing device of claim 9, wherein the instructions executed by the processor cause the processor to perform the steps of:

identifying a predetermined sequence in which two or more system processes are called by at least one of the first and second files while the respective sample executions are performed.

13. The computing device of claim 12, wherein the instructions executed by the processor cause the processor to perform the steps of:

identifying the predetermined sequence being called by the unknown file; and indicating the predetermined sequence in an assigned position of the third instance of the generated image matrix.

14. A non-transitory computer-readable storage medium storing computer executable instructions that when executed by a processor cause the processor to perform the steps of:

classifying a first file as being clean from malware and a second file as malware;

performing a sample execution of the first file and a sample execution of the second file;

identifying one or more system processes of a host operating system called during the sample execution of the first file and one or more system processes of the host operating system called during the sample execution of the second file;

generating an image matrix having a predetermined number of rows and columns, the image matrix comprising positions corresponding to where a row and column intersect, wherein each position comprises one or more pixels;

mapping each system process of the host operating system to the one or more pixels of a position on the image matrix;
indicating each system process called during the sample execution of the first file in corresponding positions of a first instance of the generated image matrix and each system process called during the sample execution of the second file in corresponding positions of a second instance of the generated image matrix;
identifying a frequency of a system process from the one or more system processes called by an unknown file;
performing a sample execution of the unknown file;
indicating, on a third instance of the generated image matrix, the identified frequency of the system process called by the unknown file;
determining at runtime a probability that the unknown file includes malware based at least in part on an analysis of the third instance of the generated image matrix in relation to at least one of the first instance and the second instance of the generated image matrix; and
performing a security action to protect the computing device from the unknown file when the probability that the unknown file includes malware is greater than a predetermined threshold the security action comprising quarantining the unknown file or deleting the unknown file.

15. The computer-program product of claim 14, wherein the instructions executed by the processor cause the processor to perform the steps of:
identifying one or more system processes called during the sample execution of the unknown file, at least one of the system processes including an application program interface (API).

16. The method of claim 1, the security action further comprising at least one of classifying the unknown file, sharing the classification of the unknown file with a remote computer system, or performing further analysis on the unknown file, or any combination thereof.

* * * * *